United States Patent [19]

Lauterbach

[11] Patent Number: 5,082,388
[45] Date of Patent: Jan. 21, 1992

[54] LOCKING TAB FOR HOOK-IN TYPE SHELVING

[75] Inventor: Achim Lauterbach, Surrey, Canada

[73] Assignee: E-Z-Rect Manufacturing Ltd., North Vancouver, Canada

[21] Appl. No.: 659,267

[22] Filed: Feb. 22, 1991

[51] Int. Cl.⁵ .............................................. B25G 3/00
[52] U.S. Cl. .................................... 403/254; 403/231
[58] Field of Search ..................... 403/254, 253, 231

[56] References Cited

U.S. PATENT DOCUMENTS

| | | |
|---|---|---|
| 977,609 | 12/1910 | Freeman . |
| 2,261,956 | 11/1941 | Brownlie et al. . |
| 3,263,821 | 8/1966 | Klene et al. . |
| 3,291,319 | 12/1966 | Novales et al. . |
| 3,315,996 | 4/1967 | Sedo . |
| 3,601,432 | 8/1971 | Fenwick et al. . |
| 3,697,034 | 10/1972 | Shell . |
| 3,862,691 | 1/1975 | Mori et al. . |
| 4,063,835 | 12/1977 | Husband et al. . |
| 4,129,279 | 12/1978 | Burkholder . |
| 4,157,228 | 6/1979 | Hammerschlag . |
| 4,222,542 | 9/1980 | Wilson et al. . |
| 4,224,776 | 9/1980 | Hammerschlag . |
| 4,341,486 | 7/1982 | Hammerschlag . |

FOREIGN PATENT DOCUMENTS

| | | |
|---|---|---|
| 1065280 | 10/1979 | Canada . |
| 1065281 | 10/1979 | Canada . |

*Primary Examiner*—Andrew V. Kundrat
*Attorney, Agent, or Firm*—Barrigar & Oyen

[57] ABSTRACT

Apparatus for securing a hooked member to a post after engagement of the hooked member with the post. The hooked member has vertically aligned upper and lower hooks. A deformable locking tab is formed atop the lower hook, beneath a recessed web portion of the hooked member. The locking tab has top, rear and front edges. A locking arm projects forwardly from the front edge. A first notch is cut in the top edge; and, a second notch is cut in the recessed web portion, adjacent the first notch. A levering implement such as a screwdriver can be fitted between the notches and used to pry the locking tab away from the locked position if it is desired to remove the hooked member from the post.

2 Claims, 3 Drawing Sheets

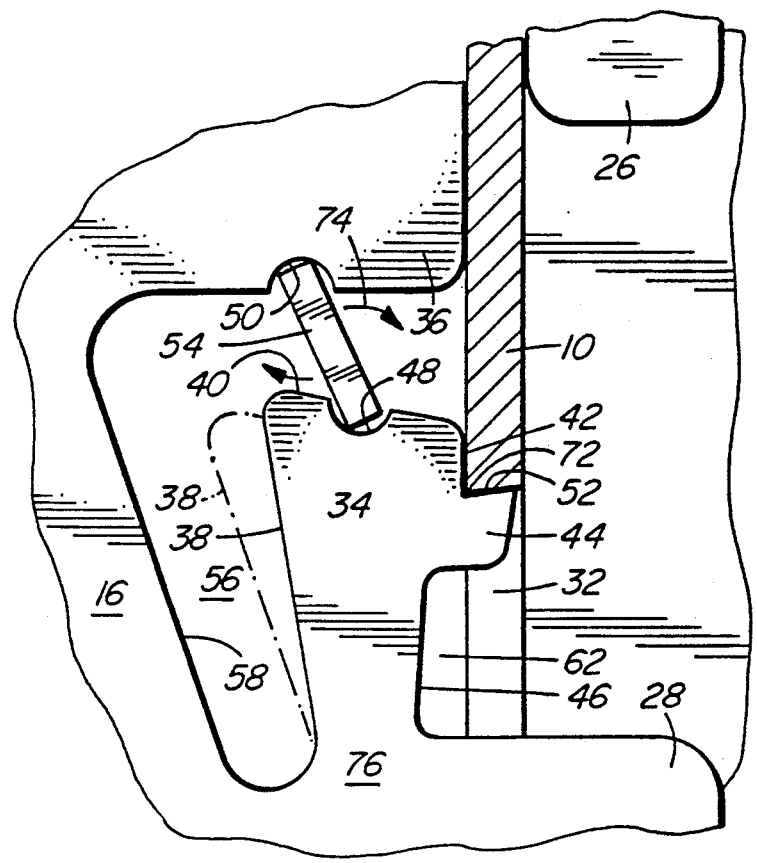
FIG. 4
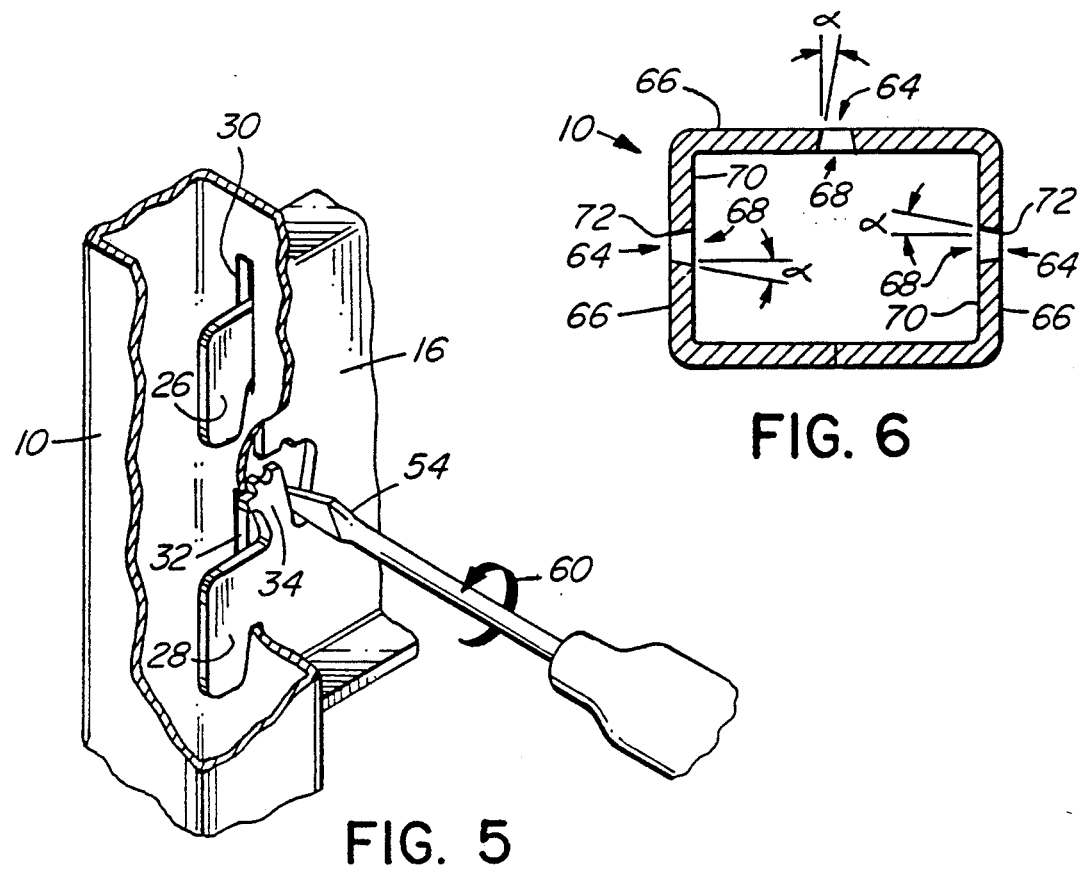
FIG. 5
FIG. 6

LOCKING TAB FOR HOOK-IN TYPE SHELVING

FIELD OF THE INVENTION

This application pertains to metal shelving units in which horizontal post connectors lockably engage vertical posts, while facilitating disengagement of the connectors from the posts, should it be desired to dismantle or adjust the shelving unit

BACKGROUND OF THE INVENTION

Hook-in type metal shelving is well known. Such shelving employs vertical support posts having a plurality of spaced slots. Pairs of posts are interconnected to form rectangular end frames by locking the hooked ends of horizontal post connectors into the post slots. At least two horizontal post connectors are used; one between the upper ends of the posts and another between the lower ends of the posts. Additional horizontal post connectors may be locked between the posts at points intermediate their upper and lower ends to further strengthen and stabilize the end frame. Pairs of end frames are then interconnected to form a rectangular-based shelving unit by connecting the hooked ends of horizontal frame connectors between the slots of opposing end frame posts. The horizontal frame connectors also serve to support the shelves, although additional shelf support brackets may be connected between the posts.

It is known to provide the hooked ends of the post connectors with locking tabs as exemplified by U.S. Pat. No. 4,063,835 to Husband et al., issued Dec. 20, 1977. As disclosed by Husband et al., once a hooked end has been fitted into a corresponding post slot, a locking tab on that hooked end is bent against the post to prevent accidental withdrawal of that hooked end from the post. If it is desired to dismantle the shelving unit, rearrange the shelves, etc. then a levering implement such as a screwdriver can be wedged between the post and the locking tab and used to pry the locking tab away from the post, back into its original unlocked position.

According to U.S. Pat. No. 4,157,228 to Hammerschlag, issued June 5, 1979; and, U.S. Pat No. 4,341,486 to Hammerschlag, issued July 27, 1982 (see also corresponding Canadian Patent Nos. 1,065,280 and 1,065,281 issued 30 Oct., 1979) it can be difficult to unlock the Husband et al. locking tabs, once they have been locked against the posts. Hammerschlag's locking tabs have upper surfaces which are slanted backwards and downwards when unlocked. When Hammerschlag's locking tabs are locked by bending them against the vertical posts, the upper surfaces of the locking tabs are either perpendicular to the centre line of the post; or, retain some backward, downward slant relative to the centre line of the post. A secondary portion of Hammerschlag's locking tab remains spaced from the post when the locking tab is locked, leaving room for insertion of a screwdriver between the secondary portion and the post. The screwdriver can then be used to pry the locking tab back into its original unlocked position in order to facilitate removal of the post connector's hooked end from the post.

The present invention provides an improved locking tab structure which may, if desired, be unlocked in either of two ways.

SUMMARY OF THE INVENTION

In accordance with the preferred embodiment, the invention provides apparatus for securing a hooked member to a post after engagement of the hooked member with the post. The hooked member has vertically aligned upper and lower hooks. The apparatus comprises a deformable locking tab formed atop the lower hook, beneath a recessed web portion of the hooked member. The locking tab has top, rear and front edges. A locking arm projects forwardly from the front edge of the locking tab. A first notch is cut in the top edge; and, a second notch cut is in the recessed web portion, adjacent the first notch. A levering implement such as a screwdriver can be fitted between the notches and used to pry the locking tab away from the locked position if it is desired to remove the hooked member from the post.

Advantageously, the locking arm projects forwardly from a central portion of the locking tab's front edge, leaving upper and lower portions of the front edge extending respectively above and below the locking arm. The upper portion of the front edge projects forwardly of the lower portion of the front edge. This leaves a gap between the lower portion of the front edge and the post, when the locking tab is in its locked position. A levering implement such as a screwdriver can also be fitted into this gap and used to pry the locking tab away from the locked position.

The post is slotted to receive the hooks. The slots comprise tapered apertures with their narrow openings in an outer face of the post and their wider openings in an opposed inner face of the post. The top edge of the locking arm frictionally engages the narrow opening when the locking tab is deformed to contact the post, thus firmly retaining the locking tab in its locked position.

BRIEF DESCRIPTION OF THE DRAWINGS

FIG. 4 is similar to FIG. 3, but shows the locking tab locked against the post, with a screwdriver positioned to unlock the tab from the post.

FIG. 5 is a partially fragmented perspective view showing one end of a post connector engaging a vertical post, with a screwdriver positioned to lock the tab against the post.

FIG. 6 is a cross-sectional end view of a post, taken with respect to line 6—6 of FIG. 1.

DETAILED DESCRIPTION OF THE PREFERRED EMBODIMENT

Figure 1:
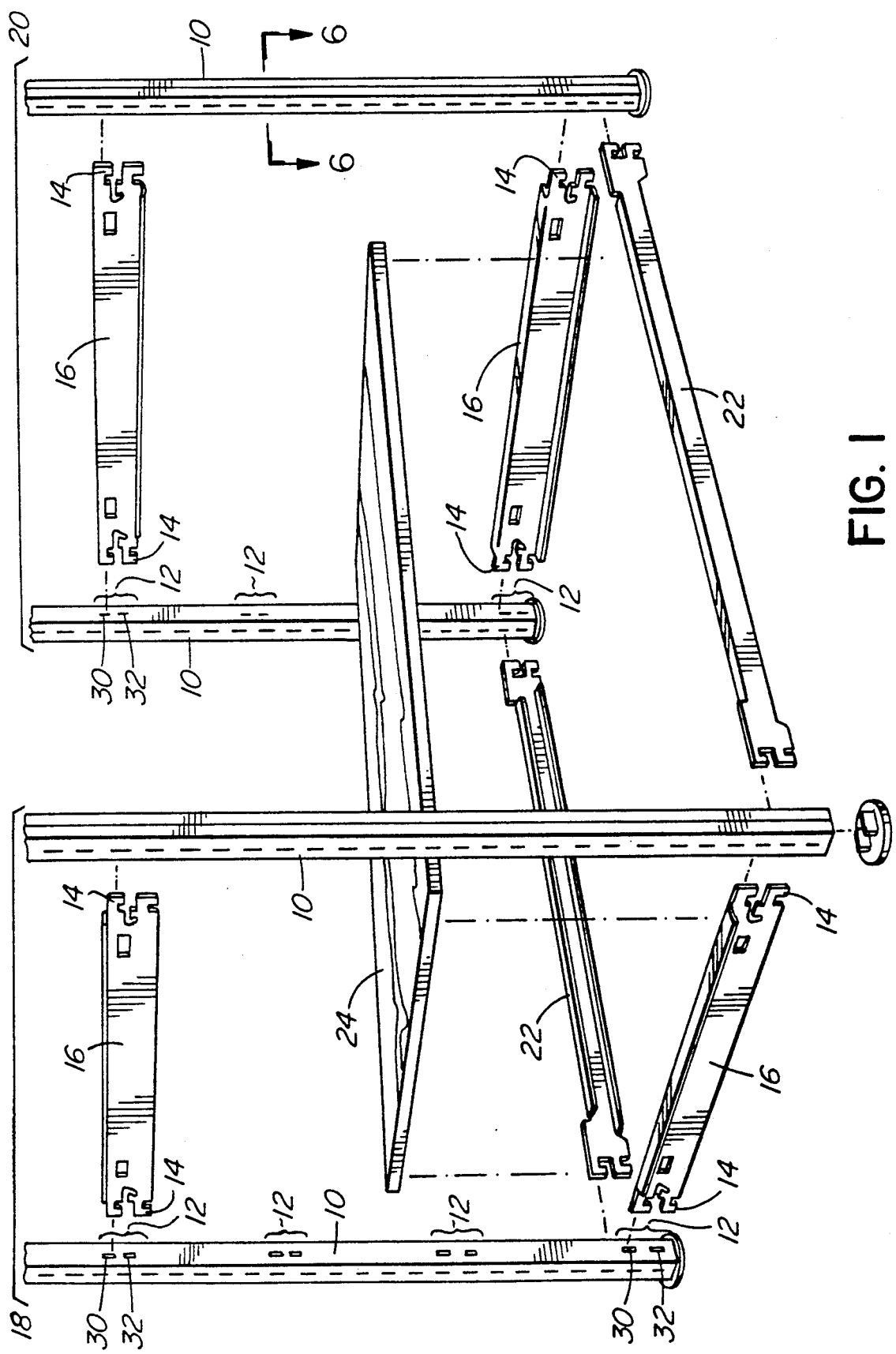
FIG. 1 is a fragmented, exploded perspective view of a typical hook-in type shelving unit incorporating the present invention.

FIG. 1 illustrates a shelving unit incorporating vertical support posts 10 having a plurality of spaced slots 12. Pairs of posts are interconnected to form rectangular end frames by locking the hooked ends 14 of horizontal post connectors 16 into the post slots. The shelving unit of FIG. 1 has two end frames 18 and 20. Each of end frames 18, 20 is shown with two post connectors 16; one post connector being hooked between the lower ends of posts 10, and another being hooked between the posts at a point intermediate their upper and lower ends. The upper ends of posts 10 are not shown, but at least one additional post connector 16 would be hooked between the upper ends of the posts in each end frame. Additional horizontal post connectors 16 may be hooked between posts 10 at other points intermediate their upper and lower ends to further strengthen and stabilize the end frames.

End frames 18, 20 are interconnected to form a rectangular-based shelving unit by connecting the hooked ends of horizontal frame connectors 22 between the slots of opposing end frame posts. Besides stabilizing the end frames, horizontal frame connectors 22 also serve to support shelves 24, although additional shelf support brackets may be connected between the posts. Only one shelf 24 is shown in FIG. 1 to avoid obscuring details of the invention.

Figure 2:
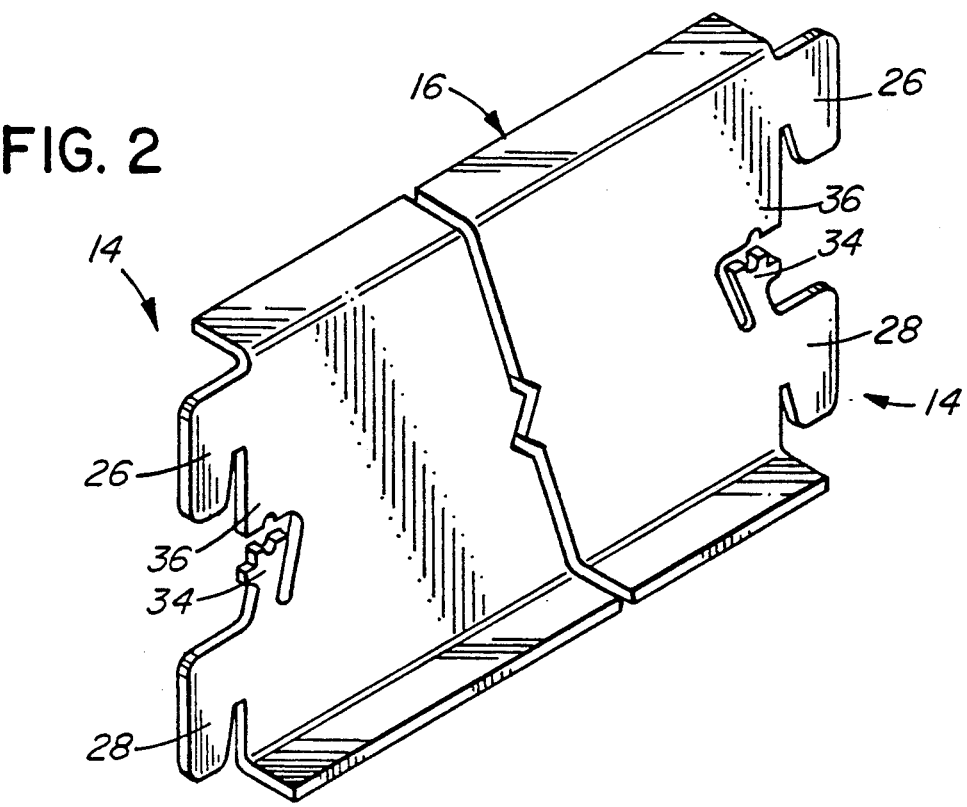
FIG. 2 is a fragmented, perspective view of a post connector constructed in accordance with the preferred embodiment of the invention.

As shown in FIG. 2, the hooked ends 14 of post connectors 16 each have a pair of downwardly projecting upper and lower hooks 26, 28 which may be inserted into a selected pair of mating upper and lower post slots 30, 32 (FIG. 1). Following such insertion, post connector 16 is forced downwardly to seat hooks 26, 28 firmly within slots 30, 32. Each hooked end 14 has a deformable locking tab 34 (FIG. 2). Once hooks 26, 28 have been seated as aforesaid, locking tab 34 is bent against post 10 to "lock" post connector 16 to post 10, preventing accidental separation of post connector 16 from post 10.

Figure 3:
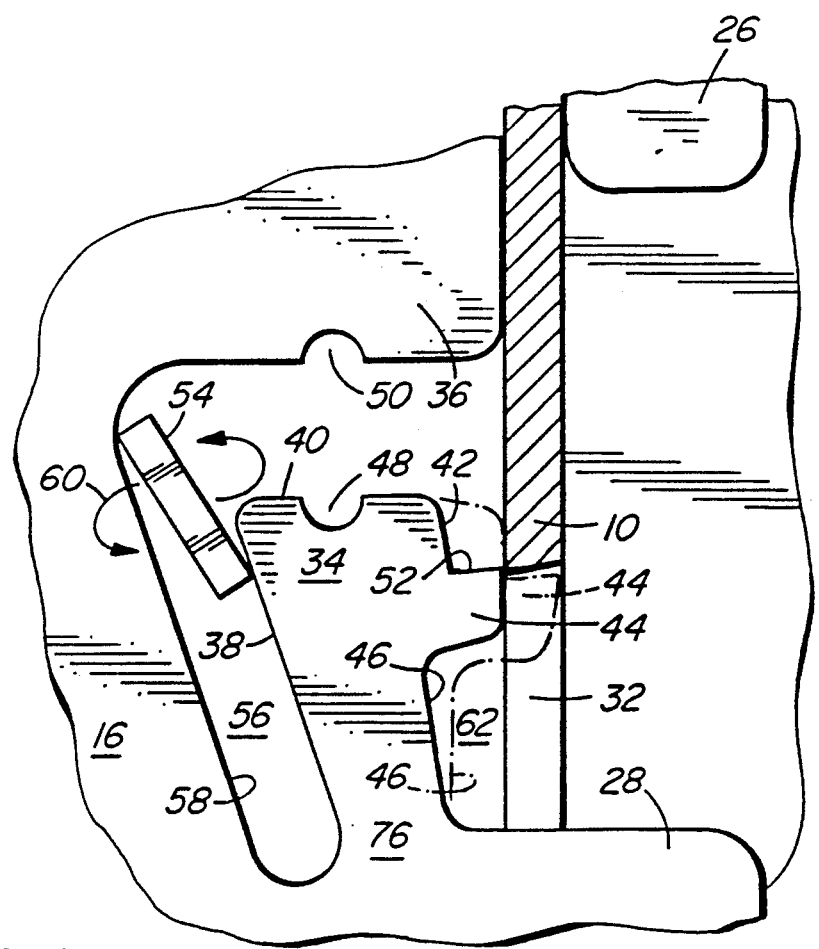
FIG. 3 is an enlarged side elevation view of one end of the post connector of FIG. 2 engaging a post (the post being shown in section); with the locking tab in its unlocked position and a screwdriver positioned to lock the tab against the post.

Locking tab 34 is formed atop lower hook 28, beneath recessed web portion 36 of post connector 16. As best seen in FIGS. 3 and 4, locking tab 34 has a rear edge 38, a top edge 40, an upper front edge portion 42, a locking arm 44, and a lower front edge portion 46. Locking arm 44 projects forwardly from a central portion of the front edge of locking tab 34, leaving upper and lower front edge portions 42, 46 extending respectively above and below locking arm 44. Upper front edge portion 42 projects forwardly of lower front edge portion 46.

A first notch 48 is cut in top edge 40. A second, corresponding notch 50 is cut in the underside of recessed web portion 36 adjacent first notch 48, such that notches 48, 50 are vertically aligned when locking tab 34 is in the unlocked position depicted in FIG. 3. Locking arm 44 has a post-engaging top edge 52.

In operation, hooks 26, 28 are seated within slots 30, 32 as aforesaid. The bit of a screwdriver 54 is then wedged in channel 56 between rear surface 38 and the portion 58 of post connector 16 horizontally adjacent locking tab 34, as shown in FIGS. 3 and 5. Rotating screwdriver 54 in the direction of arrows 60 bends locking tab 34 against post 10 into the locked position shown in FIG. 4 (and also shown in hidden detail in FIG. 3). Upper front edge portion 42 contacts the outer face of post 10 when locking tab 34 is bent into the locked position as aforesaid. Because upper front edge portion 42 projects forwardly of lower front edge portion 46, a gap 62 remains between lower front edge portion 46 and the front face of post 10.

Post 10 (best seen in FIG. 6) is produced by a roll-forming machine in a manner well known to those skilled in the art. Slots 30, 32 are punched in post 10 during the roll-forming process. Such punching inherently yields tapered slots. Preferably, slots 30, 32 are punched in post 10 such that the narrow openings 64 of slots 30, 32 are located on the outer faces 66 of post 10, and the wide openings 68 of slots 30, 32 are located on the inner faces 70 of post 10. Slots 30, 32 thus taper at an angle α. As shown in FIG. 4, when locking tab 34 is bent into its locked position, tapered corner 72 of post 10 "bites" into top edge 52, holding locking tab 34 in its locked position.

Vertically disposed notches 48, 50 facilitate disengagement of locking arm 44 from slot 32. A levering implement such as screwdriver bit 54 may be inserted between notches 48, 50 when they are disposed as depicted in FIG. 4 (i.e. when locking tab 34 is in its locked position). Screwdriver bit 54 is then rotated in the direction of arrow 74. This action withdraws locking arm 44 from slot 32, while imposing a downward force on locking arm 44 which assists in relieving the frictional engagement between post corner 72 and post-engaging top edge 52 of locking arm 44. In effect, screwdriver bit 54 momentarily widens the gap between notches 48, 50 thus easing withdrawal of locking arm 44 from slot 32. Disengagement of locking arm 44 from slot 32 may be assisted or alternatively effected by inserting a levering implement such as a screwdriver into gap 62 between lower front face 46 and the adjacent outer surface of post 10 and prying locking tab 34 away from post 10.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for securing a hooked member to a post after engagement of said hooked member with said post, said hooked member having vertically aligned upper and lower hooks, said apparatus comprising:
   (a) a deformable locking tab formed atop said lower hook, beneath a recessed web portion of said hooked member, said locking tab having top, rear and front edges;
   (b) a locking arm projecting forwardly from said front edge;
   (c) a first notch cut in said top edge; and,
   (d) a second notch cut in said recessed web portion, adjacent said first notch;
wherein:
   (i) said locking arm projects forwardly from a central portion of said front edge, leaving upper and lower portions of said front edge extending respectively above and below said locking arm;
   (ii) said front edge upper portion projects forwardly of said front edge lower portion; and,
   (iii) said post is slotted to receive said hooks, said slots comprising tapered apertures with narrow openings in an outer face of said post and wider openings in an opposed inner face of said post.

2. Apparatus as defined in claim 1, wherein a top edge of said locking arm frictionally engages said narrow opening when said locking tab is deformed to contact said post.

* * * * *